US011346084B2

(12) United States Patent
Nishimura

(10) Patent No.: US 11,346,084 B2
(45) Date of Patent: May 31, 2022

(54) WORK MACHINE, SYSTEM INCLUDING WORK MACHINE, AND METHOD FOR CONTROLLING WORK MACHINE

(71) Applicant: KOMATSU LTD., Tokyo (JP)

(72) Inventor: Minetaka Nishimura, Tokyo (JP)

(73) Assignee: KOMATSU LTD., Tokyo (JP)

(*) Notice: Subject to any disclaimer, the term of this patent is extended or adjusted under 35 U.S.C. 154(b) by 258 days.

(21) Appl. No.: 16/619,575

(22) PCT Filed: Oct. 1, 2018

(86) PCT No.: PCT/JP2018/036672
§ 371 (c)(1),
(2) Date: Dec. 5, 2019

(87) PCT Pub. No.: WO2019/069848
PCT Pub. Date: Apr. 11, 2019

(65) Prior Publication Data
US 2020/0095751 A1 Mar. 26, 2020

(30) Foreign Application Priority Data
Oct. 4, 2017 (JP) .............................. JP2017-194579

(51) Int. Cl.
E02F 9/26 (2006.01)
E02F 3/32 (2006.01)
(Continued)

(52) U.S. Cl.
CPC .................. E02F 9/26 (2013.01); E02F 3/32 (2013.01); G07C 5/085 (2013.01); E02F 3/439 (2013.01)

(58) Field of Classification Search
CPC ... E02F 3/32; E02F 3/435; E02F 3/439; E02F 9/26; E02F 9/264; G01G 19/16; G07C 5/085
See application file for complete search history.

(56) References Cited

U.S. PATENT DOCUMENTS 6,032,094 A * 2/2000 Yanagi .................... E02F 3/325
340/440
10,557,249 B2 * 2/2020 Tsuji ....................... E02F 9/261
(Continued)

FOREIGN PATENT DOCUMENTS

CN 105804148 A 7/2016
CN 206189499 U 5/2017
(Continued)

Primary Examiner — Tyler J Lee
(74) Attorney, Agent, or Firm — Faegre Drinker Biddle & Reath LLP

(57) ABSTRACT

A controller obtains a load value within a bucket when a work implement has a basic attitude, as a reference value, and a load value, within the bucket when the work implement has an attitude different from the basic attitude, as a comparison value. The controller generates correction data according to an attitude of the work implement beforehand, based on the reference value and the comparison value. The controller senses a current attitude of the work implement, and calculates a correction amount of a load value within the bucket when the work implement has the current attitude, based on the correction data. The controller corrects a load value within the bucket when the work implement has the current attitude using the correction amount, and obtains a corrected load value.

5 Claims, 6 Drawing Sheets

(51) Int. Cl.
  *G07C 5/08* (2006.01)
  *E02F 3/43* (2006.01)

(56) References Cited

U.S. PATENT DOCUMENTS

| | | |
|---|---|---|
| 2008/0319710 A1 | 12/2008 | Hsu et al. |
| 2017/0191245 A1 | 7/2017 | Shatters et al. |
| 2017/0314586 A1 | 11/2017 | Egawa et al. |
| 2018/0135273 A1* | 5/2018 | Tsuji ..................... E02F 9/261 |

FOREIGN PATENT DOCUMENTS

| | | |
|---|---|---|
| CN | 106988360 A | 7/2017 |
| CN | 107076182 A | 8/2017 |
| JP | 2003-73078 A | 3/2003 |
| JP | 2008-37562 A | 2/2008 |
| JP | 2008-50791 A | 3/2008 |
| JP | 2010-89633 A | 4/2010 |
| JP | 2017-166232 A | 9/2017 |
| WO | WO-2008/140336 A1 | 11/2008 |

* cited by examiner

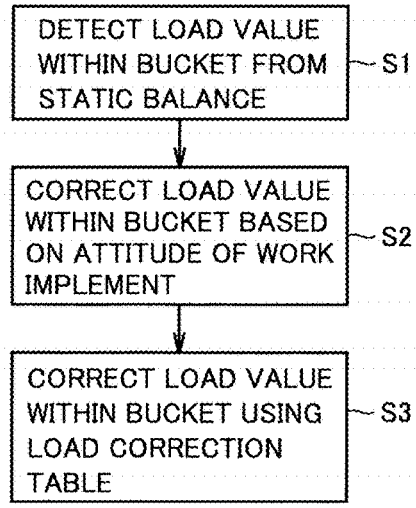

- DETECT LOAD VALUE WITHIN BUCKET FROM STATIC BALANCE — S1
- CORRECT LOAD VALUE WITHIN BUCKET BASED ON ATTITUDE OF WORK IMPLEMENT — S2
- CORRECT LOAD VALUE WITHIN BUCKET USING LOAD CORRECTION TABLE — S3

(B)

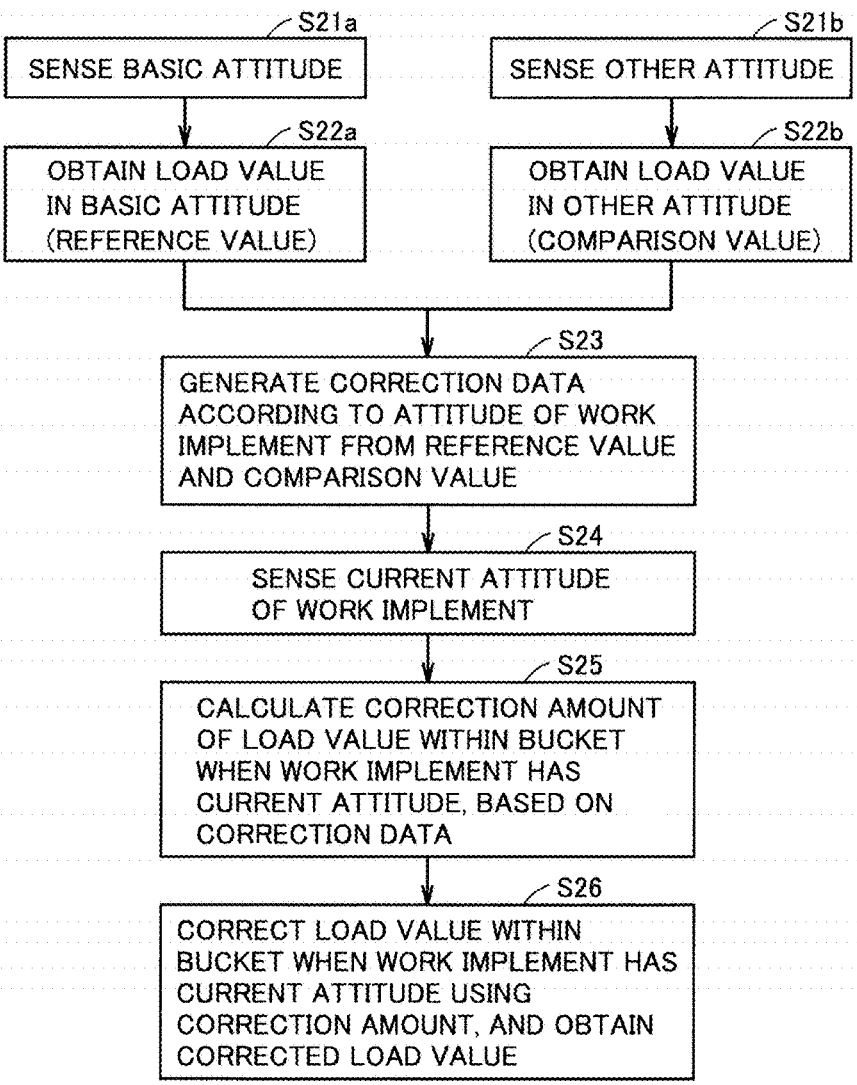

- S21a SENSE BASIC ATTITUDE
- S22a OBTAIN LOAD VALUE IN BASIC ATTITUDE (REFERENCE VALUE)
- S21b SENSE OTHER ATTITUDE
- S22b OBTAIN LOAD VALUE IN OTHER ATTITUDE (COMPARISON VALUE)
- S23 GENERATE CORRECTION DATA ACCORDING TO ATTITUDE OF WORK IMPLEMENT FROM REFERENCE VALUE AND COMPARISON VALUE
- S24 SENSE CURRENT ATTITUDE OF WORK IMPLEMENT
- S25 CALCULATE CORRECTION AMOUNT OF LOAD VALUE WITHIN BUCKET WHEN WORK IMPLEMENT HAS CURRENT ATTITUDE, BASED ON CORRECTION DATA
- S26 CORRECT LOAD VALUE WITHIN BUCKET WHEN WORK IMPLEMENT HAS CURRENT ATTITUDE USING CORRECTION AMOUNT, AND OBTAIN CORRECTED LOAD VALUE

WORK MACHINE, SYSTEM INCLUDING WORK MACHINE, AND METHOD FOR CONTROLLING WORK MACHINE

TECHNICAL FIELD

The present disclosure relates to a work machine, a system including the work machine, and a method for controlling the work machine.

BACKGROUND ART

A load value within a bucket is important for knowing a work amount of a work machine. A technique of computing a load value within a bucket is disclosed for example in Japanese Patent Laying-Open No. 2010-89633 (PTL 1).

In this publication, a current load value of a load is obtained through computation from a balance equation of moments about a boom foot pin. By integrating the current load value, an integrated load value is computed. When the integrated load value reaches a target load value, this state is reported to an operator.

CITATION LIST

Patent Literature

PTL 1: Japanese Patent Laying-Open No. 2010-89633

SUMMARY OF INVENTION

Technical Problem

Since an actual work implement is modeled in the above balance equation of moments, an error occurs between the actual work implement and a model due to the attitude of the work implement.

An object of the present disclosure is to provide a work machine capable of reducing an error due to the attitude of a work implement, a system including the work machine, and a method for controlling the work machine.

Solution to Problem

A work machine in the present disclosure includes a work implement and a controller. The work implement has a boom, an arm attached to a leading end of the boom, and a bucket attached to a leading end of the arm. The controller obtains a load value within the bucket. The controller obtains a load value within the bucket when the work implement has a basic attitude, as a reference value, and a load value within the bucket when the work implement has an attitude different from the basic attitude, as a comparison value. The controller generates correction data according to an attitude of the work implement beforehand, based on the reference value and the comparison value. The controller senses a current attitude of the work implement, and calculates a correction amount of a load value within the bucket when the work implement has the current attitude, based on the correction data. The controller obtains a corrected load value by correcting the load value within the bucket when the work implement has the current attitude using the correction amount.

A system in the present disclosure includes a work machine, and the work machine includes a work implement and a controller. The work implement has a boom, an arm attached to a leading end of the boom, and a bucket attached to a leading end of the arm. The controller obtains a load value within the bucket. The controller obtains a load value within the bucket when the work implement has a basic attitude, as a reference value, and a load value within the bucket when the work implement has an attitude different from the basic attitude, as a comparison value. The controller generates correction data according to an attitude of the work implement beforehand, based on the reference value and the comparison value. The controller senses a current attitude of the work implement, and calculates a correction amount of a load value within the bucket when the work implement has the current attitude, based on the correction data. The controller obtains a corrected load value by correcting the load value within the bucket when the work implement has the current attitude using the correction amount.

A method for controlling a work machine in the present disclosure is a method for controlling a work machine including a work implement having a boom, an arm attached to a leading end of the boom, and a bucket attached to a leading end of the arm. The method for controlling the work machine in the present disclosure obtains a load value within the bucket when the work implement has a basic attitude, as a reference value, and a load value within the bucket when the work implement has an attitude different from the basic attitude, as a comparison value, and generates correction data according to an attitude of the work implement, based on the reference value and the comparison value.

Advantageous Effects of Invention

According to the present disclosure, the load value within the bucket is corrected using the correction amount based on the correction data according to the attitude of the work implement, and thus an error due to the attitude of the work implement can be reduced.

BRIEF DESCRIPTION OF DRAWINGS

FIG. 2 illustrates flowcharts (A) and (B) showing a method for controlling the work machine in one embodiment of the present disclosure.

DESCRIPTION OF EMBODIMENTS

Hereinafter, an embodiment of the present disclosure will be described with reference to the drawings.

First, a configuration of a work machine in one embodiment of the present disclosure will be described. Hereinafter, a hydraulic excavator will be described with reference to FIG. 1 as an example of a work machine to which the idea of the present disclosure is applicable. It should be noted that the present disclosure is applicable to not only a hydraulic excavator but also a work machine having a bucket.

In the description below, "upward", "downward", "front", "back", "left", and "right" indicate directions based on an operator seated in an operator's seat 2b within an operator's compartment 2a.

Figure 1:
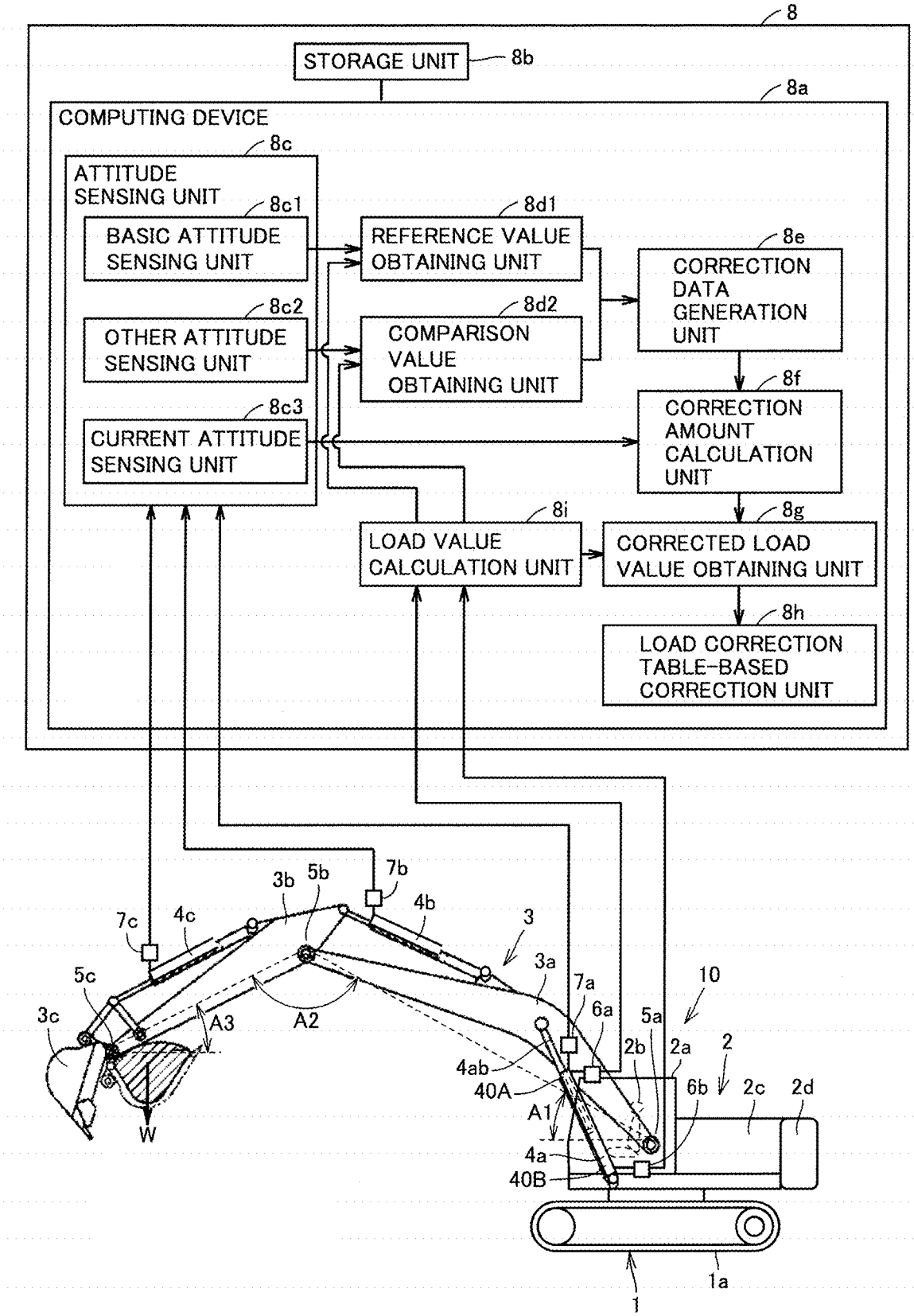
FIG. 1 is a view schematically showing a configuration of a work machine in one embodiment of the present disclosure.

FIG. 1 is a side view schematically showing a configuration of a hydraulic excavator as one example of the work machine in one embodiment of the present disclosure. As shown in FIG. 1, a hydraulic excavator 10 in the present embodiment mainly has a travel unit 1, a revolving unit 2, and a work implement 3. Travel unit 1 and revolving unit 2 constitute a main body of the work machine.

Travel unit 1 has a pair of right and left crawler belt apparatuses 1a. Each of the pair of right and left crawler belt apparatuses 1a has a crawler belt. Hydraulic excavator 10 is self-propelled as the pair of right and left crawler belts are rotationally driven.

Revolving unit 2 is mounted revolvably with respect to travel unit 1. Revolving unit 2 mainly has operator's compartment 2a, operator's seat 2b, an engine compartment 2c, and a counterweight 2d. Operator's compartment 2a is arranged, for example, on a front left side (vehicle front side) of revolving unit 2. In an internal space of operator's compartment 2a, operator's seat 2b in which the operator is to be seated is arranged.

Each of engine compartment 2c and counterweight 2d is arranged on a back side (vehicle back side) of revolving unit 2. Engine compartment 2c accommodates an engine unit (an engine, an exhaust gas treatment structure, and the like). The top of engine compartment 2c is covered with an engine hood. Counterweight 2d is arranged at the rear of engine compartment 2c.

Work implement 3 is pivotally supported on the front side of revolving unit 2 and, for example, to the right of operator's compartment 2a. Work implement 3 has, for example, a boom 3a, an arm 3b, a bucket 3c, hydraulic cylinders, 4a, 4b, and 4c, and the like. Boom 3a has a base end portion rotatably coupled to revolving unit 2 with a boom foot pin 5a. Arm 3b has a base end portion rotatably coupled to a leading end portion of boom 3a with a boom leading end pin 5b. Bucket 3c is rotatably coupled to a leading end portion of arm 3b with a pin 5c.

Boom 3a can be driven by boom cylinder 4a. By this drive, boom 3a is rotatable about boom foot pin 5a in an upward/downward direction with respect to revolving unit 2. Arm 3b can be driven by arm cylinder 4b. By this drive, arm 3b is rotatable about boom leading end pin 5b in the upward/downward direction with respect to boom 3a. Bucket 3c can be driven by bucket cylinder 4c. By this drive, bucket 3c is rotatable about pin 5c in the upward/downward direction with respect to arm 3b. Work implement 3 can be thus driven.

A pressure sensor 6a is attached to a head side of boom cylinder 4a. Pressure sensor 6a can detect a pressure of a hydraulic oil within a cylinder head-side oil chamber 40A of boom cylinder 4a (head pressure). A pressure sensor 6b is attached to a bottom side of boom cylinder 4a. Pressure sensor 6b can detect a pressure of a hydraulic oil within a cylinder bottom-side oil chamber 40B of boom cylinder 4a (bottom pressure).

Stroke sensors (sensing units) 7a, 7b, and 7c are attached to boom cylinder 4a, arm cylinder 4b, and bucket cylinder 4c, respectively.

A boom angle A1 can be calculated from a displacement amount of a cylinder rod 4ab in boom cylinder 4a. Further, an arm angle A2 can be calculated from a displacement amount of a cylinder rod in arm cylinder 4b. Further, a bucket angle A3 can be calculated from a displacement amount of a cylinder rod in bucket cylinder 4c.

Each of stroke sensors 7a, 7b, 7c and pressure sensors 6a, 6b is electrically connected to a computing device 8a in a controller 8. Thereby, the head pressure and the bottom pressure of boom cylinder 4a, boom angle A1, arm angle A2, and bucket angle A3 described above can be transmitted to computing device 8a within controller 8.

It should be noted that boom angle A1, arm angle A2, and bucket angle A3 may be calculated in computing device 8a using electric signals transmitted from stroke sensors 7a, 7b, 7c to computing device 8a.

Computing device 8a has an attitude sensing unit 8c, a reference value obtaining unit 8d1, a comparison value obtaining unit 8d2, a correction data generation unit 8e, a correction amount calculation unit 8f, a corrected load value obtaining unit 8g, a load correction table-based correction unit 8h, and a load value calculation unit 8i. Attitude sensing unit 8c has a basic attitude sensing unit 8c1, an other attitude sensing unit 8c2, and a current attitude sensing unit 8c3.

Controller 8 may have a storage unit 8b in addition to computing device 8a. Storage unit 8b may store relational data indicative of the magnitude of a correction amount of a load value in the bucket with respect to the load value in the bucket (i.e., a load correction table) and relational data for defining the correction amount that changes according to an attitude of the work implement (i.e., correction data according to the attitude of the work implement: an attitude correction table) which are described later, weights and shapes of the components of the work implement (such as boom 3a, arm 3b, and bucket 3c), and the like. Further, the two types of relational data and the like described above may be originally stored in storage unit 8b, or may be introduced from the outside of work machine 10 into storage unit 8b through an operation by the operator, or may be obtained through computation in controller 8 and thereafter stored in storage unit 8b.

Controller 8 (computing device 8a) can sense, in attitude sensing unit 8c, an attitude of work implement 3 through computation, from boom angle A1, arm angle A2, and bucket angle A3 described above.

Specifically, in basic attitude sensing unit 8c1, a basic attitude of work implement 3 described later can be sensed through computation, from boom angle A1, arm angle A2, and bucket angle A3 described above. Further, in other attitude sensing unit 8c2, another attitude of work implement 3 described later can be sensed through computation, from boom angle A1, arm angle A2, and bucket angle A3 described above. Further, in current attitude sensing unit 8c3, a current attitude of work implement 3 can be sensed through computation, from boom angle A1, arm angle A2, and bucket angle A3 described above.

Controller 8 (computing device 8a) has a function of computing a current load value (calculated load value) W within bucket 3c based on a load of boom cylinder 4a, in load value calculation unit 8i. Specifically, controller 8 (computing device 8a) has a function of computing current load value (calculated load value) W within bucket 3c from balance of moments of boom 3a, arm 3b, and bucket 3c, in load value calculation unit 8i.

Further, controller 8 (computing device 8a) can obtain a load value within bucket 3c when work implement 3 has the basic attitude, as a reference value, in reference value obtaining unit 8d1, and can obtain a load value within bucket 3c when work implement 3 has an attitude different from the basic attitude, as a comparison value, in comparison value obtaining unit 8d2. Controller 8 (computing device 8a) can generate correction data according to the attitude of work implement 3 beforehand, based on the reference value and the comparison value, in correction data generation unit 8e. Controller 8 (computing device 8a) can calculate a correction amount of a load value within bucket 3c when work implement 3 has the current attitude, based on the current attitude of work implement 3 sensed by current attitude sensing unit 8c3 and the correction data generated by correction data generation unit 8e, in correction amount calculation unit 8f. Controller 8 (computing device 8a) can correct the load value within bucket 3c when work implement 3 has the current attitude using the correction amount, and thereby obtain a corrected load value, in corrected load value obtaining unit 8g.

Further, controller 8 (computing device 8a) has a function of generating the correction data according to the attitude of work implement 3 through computation, when a load value of bucket 3c in an unloaded state changes (i.e., when bucket 3c is replaced or when soil sticks to bucket 3c). This function is performed by basic attitude sensing unit 8c1, other attitude sensing unit 8c2, reference value obtaining unit 8d1, comparison value obtaining unit 8d2, correction data generation unit 8e, and load value calculation unit 8i, when the load value of bucket 3c in the unloaded state changes.

Further, in addition to correction based on the correction data according to the attitude of work implement 3, controller 8 (computing device 8a) has a function of correcting the load value within bucket 3c based on a load correction table, in load correction table-based correction unit 8h. The load correction table is relational data indicative of the magnitude of a correction amount of the load value in bucket 3c with respect to the load value in bucket 3c.

Controller 8 may be mounted in work machine 10. Further, controller 8 may be placed in, for example, a base station or the like, instead of work machine 10. In this case, work machine 10 and controller 8 constitute a system for calculating a load value within bucket 3c.

Next, a method for computing a load value within bucket 3c in the work machine in the present embodiment will be described with reference to FIGS. 2 to 6.

FIG. 2(A) is a flowchart showing a method for controlling the work machine in one embodiment of the present disclosure. FIG. 2(B) is a flowchart showing correction of a load value (step S2) in FIG. 2(A) in detail.

As shown in FIG. 2(A), in the present embodiment, first, a current load value W within bucket 3c is detected from static balance (step S1). Then, current load value W within bucket 3c is corrected based on the attitude of work implement 3 (step S2). Then, preferably, a corrected value WP of the load value within bucket 3c is further corrected based on the load correction table (load correction) (step S3). Each of these steps S1 to S3 will be described below.

Figure 3:
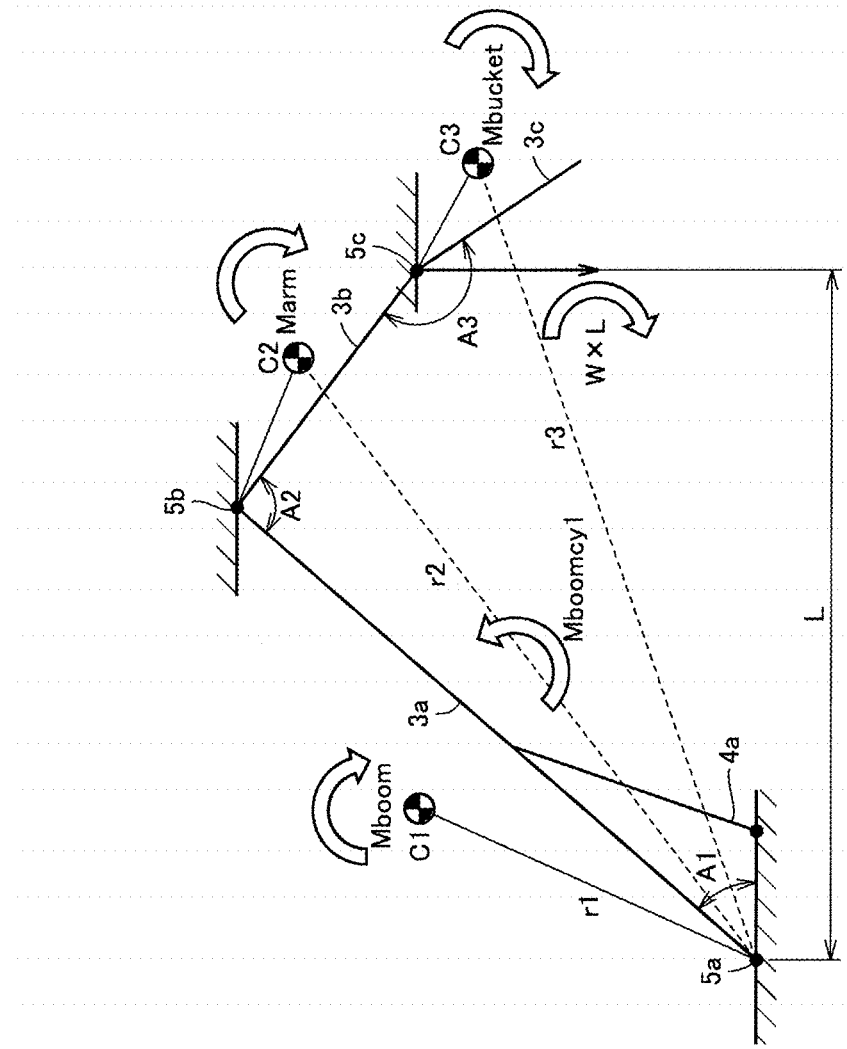
FIG. 3 is a schematic view of a work implement for illustrating balance of moments.

FIG. 3 is a schematic view of the work implement for illustrating balance of moments. As shown in FIG. 3, in the present embodiment, first, current load value W within bucket 3c is detected from static balance (step S1: FIG. 2(A)). Specifically, current load value W within bucket 3c is detected from balance of moments about boom foot pin 5a. Here, the balance of moments about boom foot pin 5a is expressed by the following equation (1).

$$Mboomcyl = Mboom + Marm + Mbucket + W \times L \quad \text{equation (1)}.$$

In equation (1), Mboomcyl is a moment of boom cylinder 4a about boom foot pin 5a. Mboom is a moment of boom 3a about boom foot pin 5a. Marm is a moment of arm 3b about boom foot pin 5a. Mbucket is a moment of bucket 3c about boom foot pin 5a. W is the current load value within bucket 3c. L is a horizontal distance from boom foot pin 5a to pin 5c (the portion where bucket 3c is supported by arm 3b).

Mboomcyl is calculated from the load (the head pressure and the bottom pressure) of boom cylinder 4a.

Mboom is calculated by multiplying a distance r1 from a center of gravity C1 of boom 3a to boom foot pin 5a by a weight M1 of boom 3a (r1×M1). The position of center of gravity C1 of boom 3a is calculated from boom angle A1 and the like. Weight M1 of boom 3a and the like are stored in storage unit 8b.

Marm is calculated by multiplying a distance r2 from a center of gravity C2 of arm 3b to boom foot pin 5a by a weight M2 of arm 3b (r2× M2). The position of center of gravity C2 of arm 3b is calculated from arm angle A2 and the like. Weight M2 of arm 3b and the like are stored in storage unit 8b.

Mbucket is calculated by multiplying a distance r3 from a center of gravity C3 of bucket 3c to boom foot pin 5a by a weight M3 of bucket 3c (r3×M3). The position of center of gravity C3 of the bucket is calculated from bucket angle A3 and the like. Weight M3 of bucket 3c and the like are stored in storage unit 8b.

As shown in FIGS. 1 and 3, in the calculation of current load value W within bucket 3c, the displacement amounts in cylinders 4a, 4b, and 4c are detected by stroke sensors 7a, 7b, and 7c, respectively. Based on the displacement amounts in cylinders 4a, 4b, and 4c, boom angle A1, arm angle A2, and bucket angle A3 are calculated by controller 8 or the like. Based on boom angle A1, arm angle A2, and bucket angle A3, the positions of centers of gravity C1, C2, and C3 are calculated by controller 8 or the like.

Moment Mboom of boom 3a about boom foot pin 5a is calculated from the product of the position of center of gravity C1 and weight M1 of boom 3a. Further, moment Marm of arm 3b about boom foot pin 5a is calculated from the product of the position of center of gravity C2 and weight M2 of arm 3b. Further, moment Mbucket of bucket 3c about boom foot pin 5a is calculated from the product of the position of center of gravity C3 and weight M3 of bucket 3c.

On the other hand, the head pressure of boom cylinder 4a is detected by pressure sensor 6a. The bottom pressure of boom cylinder 4a is detected by pressure sensor 6b. Based on the head pressure and the bottom pressure of boom cylinder 4a, moment Mboomcyl of boom cylinder 4a about boom foot pin 5a is calculated by controller 8 or the like.

Further, based on boom angle A1 and arm angle A2 calculated above and a length of boom 3a and a length of arm 3b, horizontal distance L from boom foot pin 5a to pin 5c is calculated by controller 8 or the like.

By substituting moments Mboomcyl, Mboom, Marm, and Mbucket and distance L calculated above into the above equation (1), current load value W within bucket 3c is calculated by controller 8 or the like.

The present inventor has found that load value W calculated as described above changes due to the attitude of work implement 3. The reason for the change in load value W due to the attitude of work implement 3 is considered to be because the above calculation model shown in FIG. 3 has an assumption different from actual work implement 3.

Specifically, hydraulic cylinders 4b and 4c shown in FIG. 1 are not modeled in the calculation model shown in FIG. 3.

Further, the calculation model shown in FIG. 3 assumes that a load is located at a leading end of arm 3b (that is, at pin 5c). On the other hand, in actual work machine 10 shown in FIG. 1, a load is located within bucket 3c. Accordingly, the assumption of the calculation model in FIG. 3 and actual work implement 3 in FIG. 1 are different from each other in the position of the load.

Further, the calculation model shown in FIG. 3 assumes that bucket 3c is rotated to be closest to arm 3b and fixed at that position. On the other hand, in actual work machine 10 shown in FIG. 1, bucket 3c is also rotated with respect to arm 3b as boom 3a and arm 3b are operated. Accordingly, the assumption of the calculation model in FIG. 3 and actual work implement 3 in FIG. 1 are also different from each other in the rotating position of bucket 3c with respect to arm 3b.

Further, the calculation model shown in FIG. 3 does not assume a sliding resistance of boom cylinder 4a (friction caused when the cylinder is operated). On the other hand, in actual work machine 10 shown in FIG. 1, the sliding resistance of boom cylinder 4a is generated. Accordingly, the assumption of the calculation model in FIG. 3 and actual work implement 3 in FIG. 1 are also different from each other in the presence or absence of the sliding resistance of boom cylinder 4a.

Calculated current load value W within bucket 3c is considered to include an error E1 caused because the calculation model in FIG. 3 has an assumption different from actual work implement 3 shown in FIG. 1 as described above.

Accordingly, correction for removing error E1 due to the difference from the calculation model from load value W is subsequently performed. The correction is performed by correcting current load value W within bucket 3c based on the attitude of the work implement (step S2: FIG. 2(A)). The correction will be described with reference to FIGS. 2(B), 4, and 5.

Figure 4:
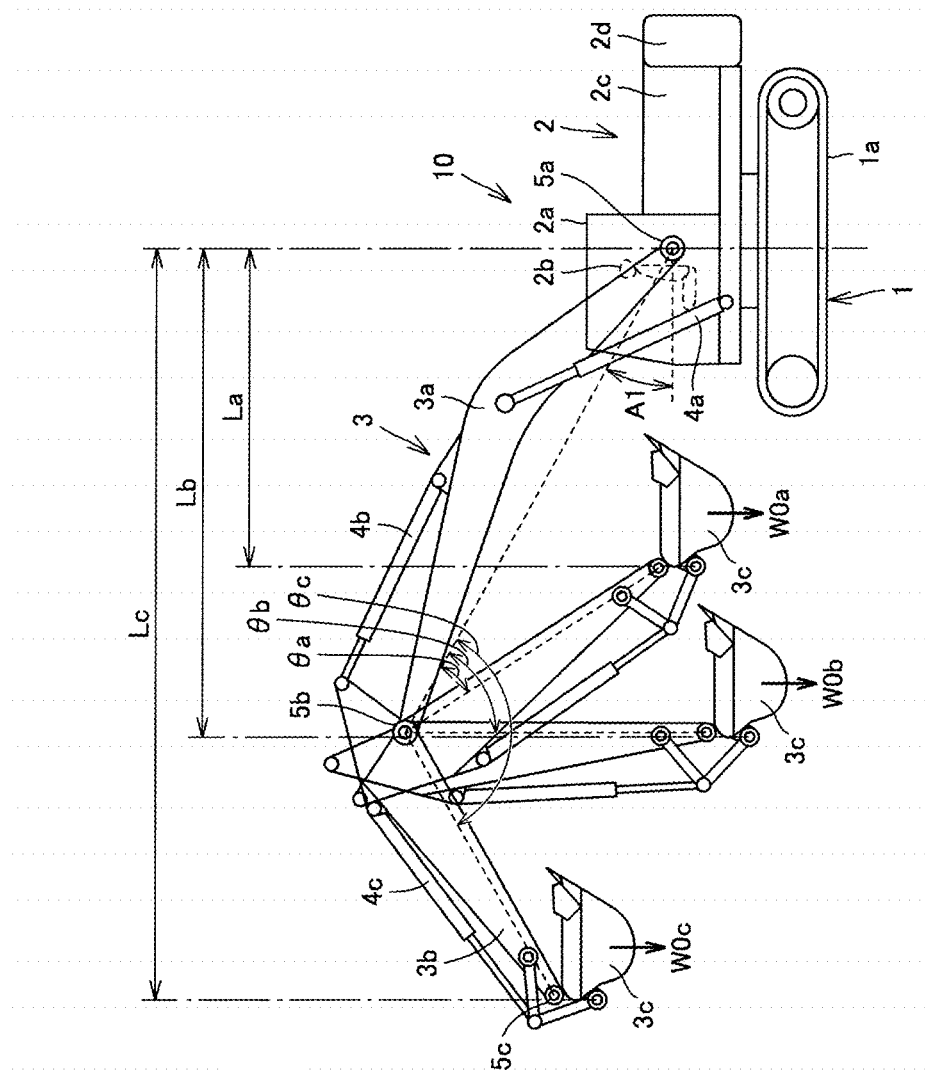
FIG. 4 is a view of the work machine for illustrating generation of correction data according to the attitude of the work implement in a hydraulic excavator shown in FIG. 1.
Figure 5:
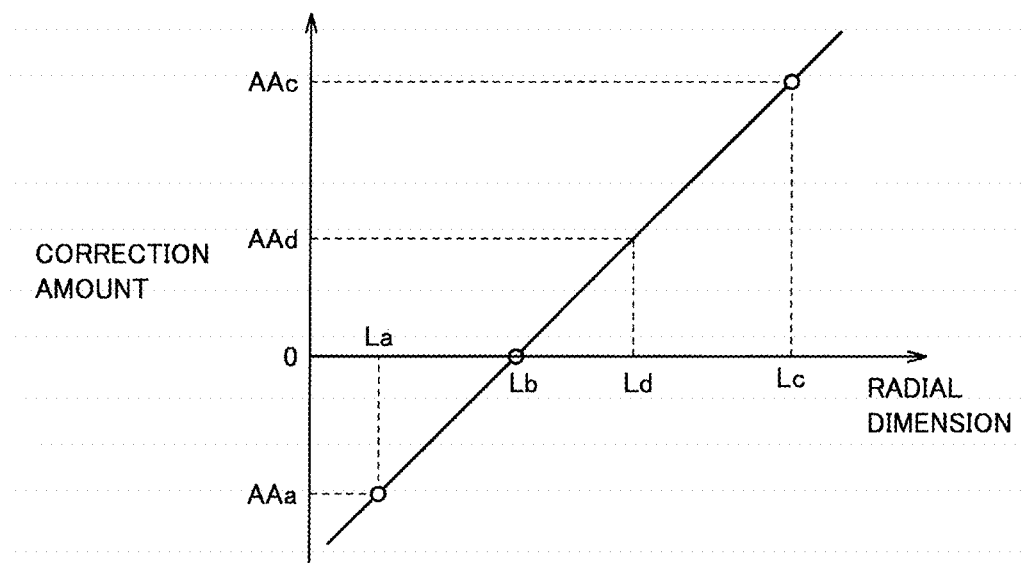
FIG. 5 is a view showing the correction data according to the attitude of the work implement.

FIG. 4 is a view for illustrating generation of correction data according to the attitude of the work implement (an attitude correction table) in the hydraulic excavator shown in FIG. 1. FIG. 5 is a view showing the correction data according to the attitude of the work implement (the attitude correction table).

As shown in FIG. 4, first, a plurality of attitudes (for example, three attitudes) of work implement 3 are sensed. Here, an arm angle θa is set to 50°, an arm angle θb is set to 70°, and an arm angle θc is set to 110°. Further, at arm angle θb, arm 3b extends, for example, in a vertical direction (perpendicularly) with respect to a ground surface. The attitude of work implement 3 at arm angle θb is defined as the basic attitude. Further, the attitude of work implement 3 at each of arm angle θa and arm angle θc is an attitude different from the basic attitude at arm angle θb.

In light of the foregoing, first, the basic attitude of work implement 3 (the attitude at arm angle θb) is sensed by basic attitude sensing unit 8c1 (FIG. 1) (step S21a, FIG. 2(B)). Further, other attitudes different from the basic attitude (attitudes at arm angles θa and θc) are sensed by other attitude sensing unit 8c2 (FIG. 1) (step S21b, FIG. 2(B)).

Subsequently, a load value W0 of bucket 3c in an unloaded state is measured when work implement 3 has each of the plurality of (for example, three) attitudes. Specifically, based on the basic attitude (the attitude at arm angle θb) sensed by basic attitude sensing unit 8c1 (FIG. 1) and a load value W0b of bucket 3c in the unloaded state calculated by load value calculation unit 8i (FIG. 1), reference value obtaining unit 8d1 (FIG. 1) obtains load value W0b of bucket 3c in the unloaded state, as a reference value (step S22a, FIG. 2(B)). Further, based on the other attitudes (the attitudes at arm angles θa and θc) sensed by other attitude sensing unit 8c2 (FIG. 1) and load values W0a and W0c of bucket 3c in the unloaded state calculated by load value calculation unit 8i (FIG. 1), comparison value obtaining unit 8d2 (FIG. 1) obtains load values W0a and W0c of bucket 3c in the unloaded state, as comparison values (step S22b, FIG. 2(B)). Measurement of these load values W0a, W0b, and W0c is performed using the calculation model shown in FIG. 3.

Thereafter, correction data according to the attitude of work implement 3 is generated from the reference value and the comparison values (step S23, FIG. 2(B)). The correction data is generated as described below.

In generating the correction data, three arm angles θa, θb, and θc shown in FIG. 1 are converted into radial dimensions La, Lb, and Lc, respectively. Each of radial dimensions La, Lb, and Lc is a horizontal distance from the position of a hook of work implement 3 to the center of revolution of work machine 10. It should be noted that each of radial dimensions La, Lb, and Lc may be a horizontal distance from the position of the hook of work implement 3 to boom foot pin 5a.

Further, a correction amount is obtained from load values W0a, W0b, and W0c of bucket 3c in the unloaded state. As the correction amount, a correction amount AAa of load value W0a relative to load value W0b and a correction amount AAc of load value W0c relative to load value W0b are obtained.

Correction amount AAa is calculated by subtracting load value W0b from load value W0a (AAa=W0a−W0b). Further, correction amount AAc is calculated by subtracting load value W0b from load value W0c (AAc=W0c−W0b).

As shown in FIG. 5, subsequently, the above results ((axis of abscissas, axis of ordinates)=(La, AAa), (Lb, 0), (Lc, AAc)) are plotted on a graph having the axis of abscissas representing the radial dimension and the axis of ordinates representing the correction amount. Then, on the graph, a point (La, AAa) and a point (Lb, 0) are connected by a straight line, and a point (Lc, AAc) and the point (Lb, 0) are connected by a straight line. In this manner, the correction data according to the attitude of work implement 3 (the attitude correction table) is generated by correction data generation unit 8e (FIG. 1) in controller 8 (computing device 8a), from the reference value (load value W0b) and the comparison values (load values W0a, W0c) (step S23, FIG. 2(B)). The attitude correction table is expressed by a linear function. The attitude correction table generated as described above may be stored in storage unit 8b in controller 8 shown in FIG. 1 or the like, or may be stored in another storage unit.

After the attitude correction table described above is generated, current load value W in bucket 3c calculated using the calculation model shown in FIG. 3 is corrected based on the attitude correction table. Correction of load value W will be described below.

Specifically, first, the current attitude of work implement 3 is sensed by current attitude sensing unit 8c3 (FIG. 1) in controller 8 (computing device 8a) (step S24, FIG. 2(B)). The current attitude of work implement 3 is sensed by being computed by controller 8 (computing device 8a) from boom angle A1, arm angle A2, and bucket angle A3 described above.

In a case where the radial dimension when work implement 3 has the current attitude is Ld in FIG. 5, the correction amount is determined as AAd from the attitude correction table of FIG. 5. In this manner, correction amount AAd of the load value within bucket 3c is calculated by correction amount calculation unit 8f (FIG. 1) in controller 8 (computing device 8a) (step S25, FIG. 2(B)).

Subsequently, load value W in bucket 3c when work implement 3 has the current attitude is calculated by load value calculation unit 8i in controller 8 (computing device 8a). Calculation of load value W is performed by load value calculation unit 8i in controller 8 (computing device 8a), using the calculation model shown in FIG. 3.

Subsequently, based on correction amount AAd and load value W, load value W within bucket 3c when work implement 3 has the current attitude is corrected by corrected load value obtaining unit 8g in controller 8 (computing device 8a), and thereby corrected load value WP is obtained (step S26, FIG. 2(B)). Specifically, corrected load value WP is obtained by adding correction amount AAd to current load value W in bucket 3c (WP=W+AAd). Thus, current load value W within bucket 3c is corrected based on the correction amount that changes according to the attitude of work implement 3.

Actually, the attitude of work implement 3 changes every second while work implement 3 is operated. Accordingly, at each predetermined time, load value W and correction value AAd at that time are calculated, and thus corrected load value WP is computed.

Here, the sliding resistance in boom cylinder 4a varies for each machine. Thus, load value WP corrected as described above is considered to include an error E2 due to the sliding resistance of boom cylinder 4a. The present inventor has found that error E2 due to the sliding resistance of boom cylinder 4a can be appropriately removed by using relational data in which the absolute value of the correction amount decreases with an increase in the load value within bucket 3c (a load correction table).

Figure 6:
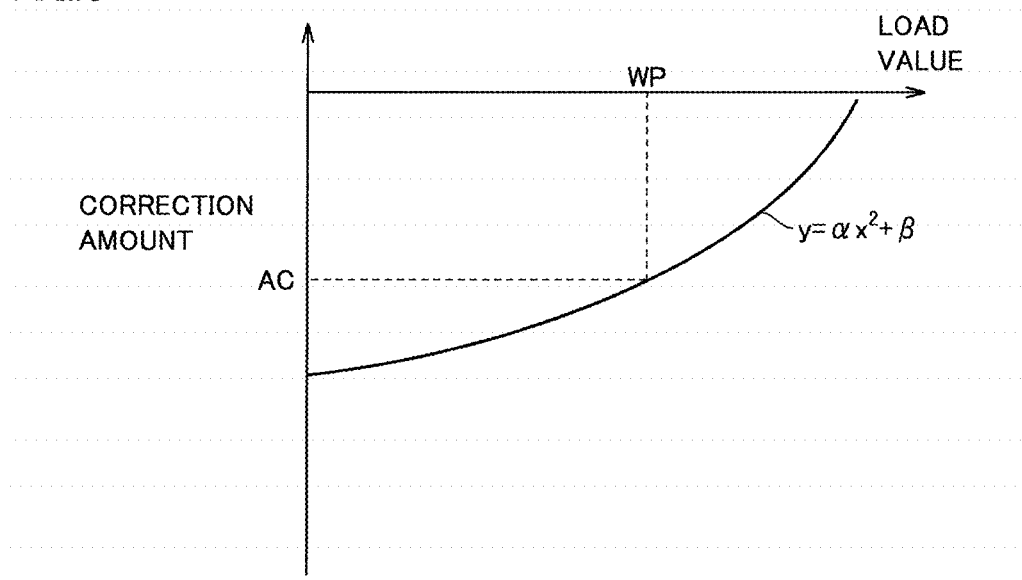
FIG. 6 is a view showing the relation between a load value within a bucket and a correction amount of the load value within the bucket.

Specifically, in order to investigate the influence of error E2 due to the sliding resistance of boom cylinder 4a, the present inventor measured an error of a load value measured at a predetermined arm angle in an unloaded state, and an error of a load value measured with a predetermined load placed in bucket 3c, and investigated the relation that satisfies the errors of the load values. As a result, the present inventor has found that the above error can be reduced by using relational data in which the absolute value of the correction amount decreases with an increase in the load value within bucket 3c (a load correction table) as shown in FIG. 6. The present inventor has also found that the relation between the load value and the error in the load correction table can be approximated by a quadratic function ($y=\alpha x^2+\beta$).

Accordingly, correction for removing error E2 due to the sliding resistance of boom cylinder 4a from corrected load value WP is subsequently performed by using the load correction table shown in FIG. 6. The correction is performed by correcting corrected load value WP within bucket 3c based on relational data indicative of the magnitude of the correction amount (error) of the load value in bucket 3c with respect to the load value in bucket 3c (step S3: FIG. 2(A)). The correction using the load correction table is performed by load correction table-based correction unit 8h in controller 8 (computing device 8a) shown in FIG. 1.

After error E1 of work implement 3 is corrected, the load value in the load correction table refers to corrected load value WP.

In addition, in the load correction table, as described above, the relation between the load value within bucket 3c and the magnitude of the correction amount of the load value within bucket 3c is expressed by a quadratic function, for example. In this case, the absolute value of the magnitude of the correction amount of the load value decreases quadratically with an increase in the load value within bucket 3c.

In the correction using the load correction table, a true load value WT is calculated by removing the error from corrected load value WP on which the correction of error E1 has been performed, based on the relation indicated in the load correction table.

Specifically, a correction amount AC in load value WP is determined from the curve of the function $y=\alpha x^2+\beta$ in the load correction table. True load value WT is determined by subtracting correction amount AC from load value WP (WT=WP−AC). In this manner, in the present embodiment, true load value WT is determined by correcting error E1 due to the difference between the calculation model and the actual machine and error E2 due to the sliding resistance of boom cylinder 4a.

The following describes calibration of the load value within bucket 3c when the load value of bucket 3c in an unloaded state changes from the load value of the bucket before replacement, due to replacement of bucket 3c or due to sticking of soil and the like to bucket 3c.

In a case where bucket 3c is replaced or in a case where soil and the like stick to bucket 3c, the load value of bucket 3c in the unloaded state changes. In this case, performing the above correction may be insufficient to accurately calculate the load value within bucket 3c. Therefore, it is desirable to calibrate the load value within bucket 3c in the case where bucket 3c is replaced or in the case where soil and the like stick to bucket 3c. The following describes the calibration, taking the case where bucket 3c is replaced as an example. The same applies to the case where soil and the like stick to bucket 3c.

In the present embodiment, in the case where bucket 3c is replaced or in the case where soil and the like stick to bucket 3c, an attitude correction table as shown in FIG. 5 is generated again for replaced bucket 3c. In generating the attitude correction table, load value W0 of bucket 3c in an unloaded state is measured when work implement 3 has each of a plurality of (for example, three) attitudes, as in the case described above.

Specifically, load values W0a1, W0b1, and W0c1 of bucket 3c in the unloaded state are measured in the attitudes at arm angles θa, θb, and θc, respectively. Three arm angles θa, θb, and θc are converted into radial dimensions La, Lb, and Lc, respectively. Further, a correction amount is obtained from load values W0a1, W0b1, and W0c1 of bucket 3c in the unloaded state. As the correction amount, a correction amount ABa of load value W0a1 at arm angle θa relative to load value W0b1 at arm angle θb and a correction amount ABc of load value W0c1 at arm angle θc relative to load value W0b1 at arm angle θb are obtained.

Correction amount ABa is calculated by subtracting load value W0b1 at arm angle θb from load value W0a1 at arm angle θa (ABa=W0a1−W0b1). Further, correction amount ABc is calculated by subtracting load value W0b1 at arm angle θb from load value W0c1 at arm angle θc (ABc=W0c1−W0b1).

Figure 7:
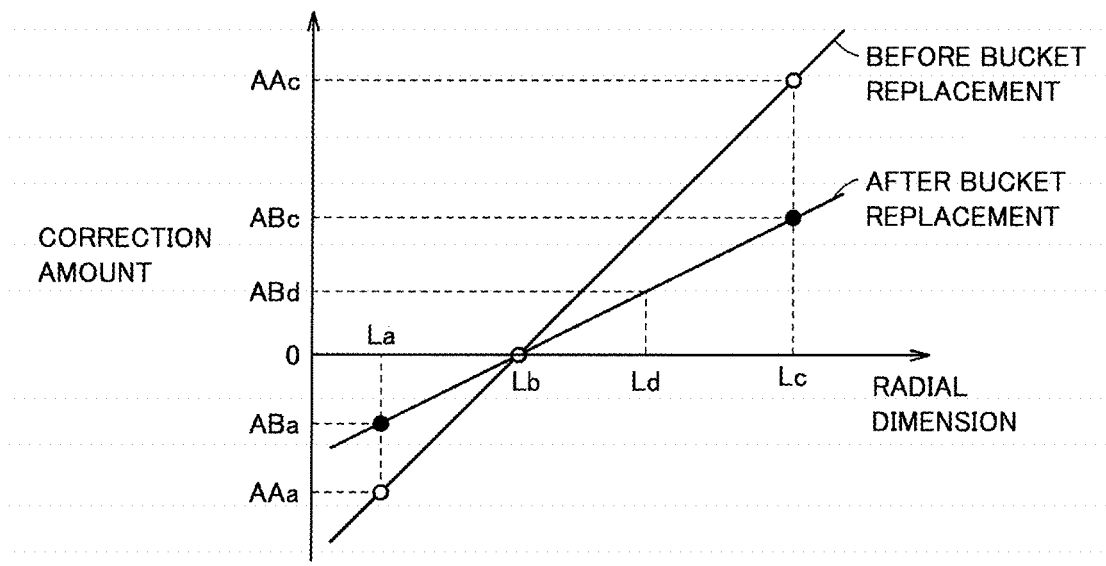
FIG. 7 is a view showing the correction data according to the attitude of the work implement before and after replacement of the bucket.

As shown in FIG. 7, subsequently, the above results are plotted on a graph having the axis of abscissas representing the radial dimension and the axis of ordinates representing the correction amount. Then, on the graph, a point indicating correction amount ABa at radial dimension La and a point indicating a correction amount of 0 at radial dimension Lb are connected by a straight line, and a point indicating correction amount ABc at radial dimension Lc and the point indicating a correction amount of 0 at radial dimension Lb are connected by a straight line. Thereby, correction data according to the attitude of the work implement (an attitude correction table) after replacement of bucket 3*c* is generated. The attitude correction table after replacement of bucket 3*c* generated as described above may be stored in storage unit 8*b* in controller 8 shown in FIG. 1 or the like, or may be stored in another storage unit.

After the attitude correction table shown in FIG. 7 is generated, current load value W within replaced bucket 3*c* (a load value calculated using the calculation model shown in FIG. 3) is corrected based on the attitude correction table. Specifically, in a case where the radial dimension at a time point when load value W is calculated is Ld in FIG. 7, the correction amount is determined as ABd from the attitude correction table of FIG. 7. Accordingly, corrected load value WP is obtained by adding correction amount ABd to current load value W within replaced bucket 3*c* (WP=W+ABd). Thus, current load value W within bucket 3*c* is corrected based on the correction amount that changes according to the attitude of work implement 3.

Actually, the attitude of work implement 3 changes every second while work implement 3 is operated. Accordingly, at each predetermined time, load value W and correction value ABd at that time are calculated, and thus corrected load value WP is computed.

Subsequently, correction for removing error E2 due to the sliding resistance in boom cylinder 4*a* after replacement of bucket 3*c* from corrected load value WP is performed. The correction is performed by correcting load value WP within bucket 3*c* based on relational data indicative of the magnitude of an error of the load value in bucket 3*c* with respect to the load value in bucket 3*c*, as in the case shown in FIG. 5.

Figure 8:
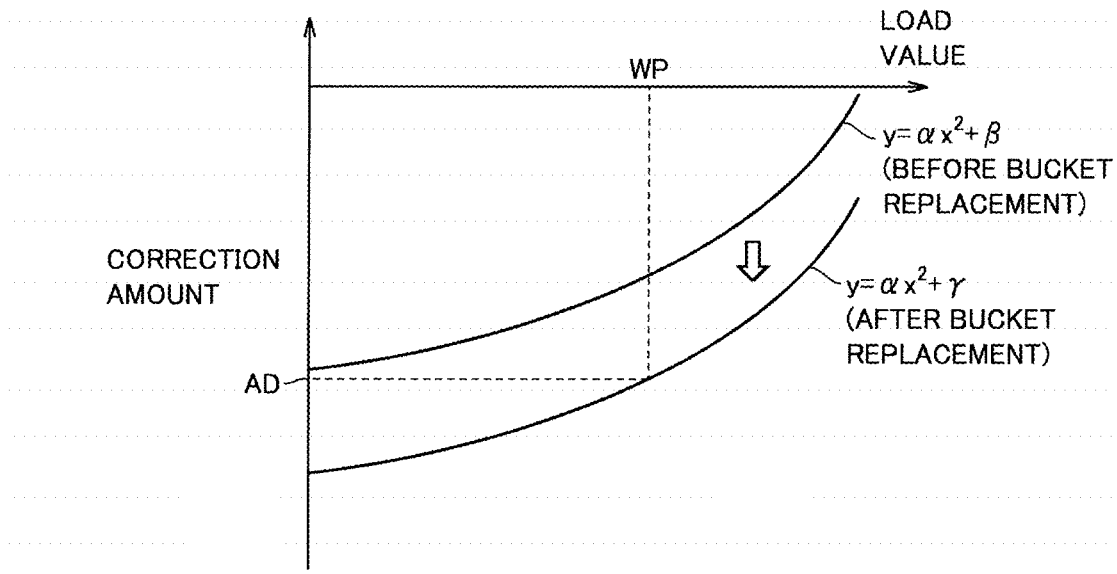
FIG. 8 is a view showing the relation between the load value within the bucket and the correction amount of the load value within the bucket before and after replacement of the bucket.

However, since bucket 3*c* is replaced, the load value of bucket 3*c* in the unloaded state after replacement changes from the load value of bucket 3*c* in the unloaded state before replacement. Accordingly, it is necessary to change the quadratic curve in the load correction table to a quadratic curve corresponding to the load value of bucket 3*c* in the unloaded state after replacement, as shown in FIG. 8. In this case, it is also necessary to change the correction amount, by an amount of change in the load value of bucket 3*c* in the unloaded state after replacement relative to the load value of bucket 3*c* in the unloaded state before replacement. Therefore, it is necessary to move the curve of the quadratic function for bucket 3*c* after replacement in parallel with the curve of the quadratic function for bucket 3*c* before replacement, in the direction of the axis of ordinates on the graph.

In the correction using the changed load correction table, true load value WT is calculated by removing load error E2 from corrected load value WP on which the correction of error E1 has been performed, based on the relation indicated in the load correction table.

Specifically, a correction amount AD in load value WP is determined from the curve of a function $y=\alpha x^2+\gamma$ in the load correction table. True load value WT is determined by subtracting correction amount AD from load value WP (WT=WP−AD). In this manner, in the present embodiment, true load value WT is determined by correcting error E1 due to the difference between the calculation model and the actual machine and error E2 due to the sliding resistance of boom cylinder 4*a* after replacement of bucket 3*c*.

It should be noted that, in the case where bucket 3*c* is replaced or in the case where soil and the like stick to bucket 3*c*, the load value within bucket 3*c* may be calibrated by the operator pressing an operation button for starting calibration. Further, the load value within bucket 3*c* may be automatically calibrated by work machine 10 detecting replacement of bucket 3*c*, or by work machine 10 detecting sticking of soil to bucket 3*c*.

Next, the function and effect of the present embodiment will be described.

In the present embodiment, by using the attitude correction table shown in FIG. 5, the load value within bucket 3*c* is corrected using the correction amount based on the correction data according to the attitude of work implement 3. Thereby, the error of the load value due to the attitude of work implement 3 is reduced, and an accurate load value can be calculated.

Further, in the present embodiment, as shown in FIGS. 1 and 5, controller 8 generates the correction data according to the attitude of work implement 3 through computation, from load values W0*a*, W0*b*, and W0*c* of bucket 3*c* in the unloaded state measured when work implement 3 has a plurality of attitudes different from each other. Thereby, the attitude correction table can be easily generated.

Further, in the present embodiment, as shown in FIGS. 1 and 7, when the load value of bucket 3*c* in the unloaded state changes, controller 8 generates the correction data according to the attitude of work implement 3 after the change in the load value, through computation. Thereby, it is possible to calibrate the load value within bucket 3*c* when the load value of bucket 3*c* in the unloaded state changes due to replacement of bucket 3*c* or due to sticking of soil and the like to bucket 3*c*.

Further, in the present embodiment, as shown in FIG. 1, storage unit 8*b* for storing the correction data according to the attitude of work implement 3 (the attitude correction table) is provided. Thereby, it is possible to store a plurality of attitude correction tables in storage unit 8*b*, and take out a necessary attitude correction table from storage unit 8*b* and use it in response to replacement of bucket 3*c* or the like.

Further, in the present embodiment, as shown in FIG. 6, controller 8 corrects the load value within bucket 3*c* based on the relational data indicative of the magnitude of the error of the load value in bucket 3*c* with respect to the load value in bucket 3*c* (the load correction table), in addition to correction based on the correction data according to the attitude of work implement 3. Thereby, the error due to the sliding resistance of boom cylinder 4*a* can be reduced, and a more accurate load value within bucket 3*c* can be obtained.

The following describes a summary of a method for controlling the work machine described above.

As shown in FIG. 1, the method for controlling the work machine in the present disclosure is a method for controlling a work machine including work implement 3 having bucket 3*c*, and is configured to correct a load value within bucket 3*c* based on a correction amount that changes according to an attitude of work implement 3.

Specifically, the method for controlling the work machine in the present disclosure obtains load value W0*b* within bucket 3*c* when work implement 3 has a basic attitude, as a reference value, and load value W0*a* or W0*c* within bucket 3*c* when work implement 3*c* has an attitude different from the basic attitude, as a comparison value, and generates correction data according to an attitude of work implement 3.

Further, as shown in FIG. 4, in the method for controlling the work machine in the present disclosure, for bucket 3*c* in an unloaded state, a first load value (W0a or W0c) of bucket 3c in a first attitude (at arc angle θa or θc) and a second load value (W0b) of bucket 3c in a second attitude (at arc angle θb) are measured. Then, as shown in FIG. 5, based on the first load value in the first attitude and the second load value in the second attitude, first relational data in which the correction amount changes according to the attitude of work implement 3 (a first correction table) is generated. Based on the generated first relational data, load value W0 in bucket 3c during working of work machine 10 is corrected, and thus corrected load value WP is obtained.

Further, corrected load value WP is corrected based on second relational data in which the correction amount (absolute value) decreases with an increase in the load value (a second correction table) as shown in FIG. 5, and thus true load value WT is obtained.

Further, after bucket 3c is replaced, for replaced bucket 3c in an unloaded state, a third load value (W0a or W0c) of bucket 3c in a third attitude (at arc angle θa or θc) and a fourth load value (W0b) of bucket 3c in a fourth attitude (at arc angle θb) are measured. Then, as shown in FIG. 7, based on the third load value in the third attitude and the fourth load value in the fourth attitude, third relational data in which the correction amount changes according to the attitude of work implement 3 (a third correction table) is generated. Based on the generated third relational data, load value W0 in replaced bucket 3c during working of work machine 10 is corrected, and thus corrected load value WP is obtained.

Further, corrected load value WP is corrected based on fourth relational data in which the correction amount (absolute value) decreases with an increase in the load value (a fourth correction table) as shown in FIG. 7, and thus true load value WT is also obtained in replaced bucket 3c.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: travel unit; 1a: crawler belt apparatus; 2: revolving unit; 2a: operator's compartment; 2b: operator's seat; 2c: engine compartment; 2d: counterweight; 3: work implement; 3a: boom; 3h: arm; 3c: bucket; 4a: boom cylinder; 4ab: cylinder rod; 4b: arm cylinder; 4c: bucket cylinder; 5a: boom foot pin; 5b: boom leading end pin; 6a, 6b: pressure sensor; 7a: stroke sensor; 8: controller; 8a: computing device; 8b: storage unit; 10: work machine (hydraulic excavator); 40A: cylinder head-side oil chamber; 40B: cylinder bottom-side oil chamber.

The invention claimed is:

1. A work machine comprising:
a work implement having a boom, an arm attached to a leading end of the boom, and a bucket attached to a leading end of the arm; and
a controller:
obtaining a load value within the bucket based on at least one signal of at least one sensor connected to the work implement;
obtaining a load value within the bucket based on the at least one signal of the at least one sensor connected to the work implement when the work implement has a basic attitude, as a reference value, and a load value within the bucket based on the at least one signal of the at least one sensor connected to the work implement when the work implement has an attitude different from the basic attitude, as a comparison value;
generating correction data according to an attitude of the work implement beforehand, based on the reference value and the comparison value;
sensing, via the at least one signal of the at least one sensor connected to the work implement, a current attitude of the work implement;
calculating a correction amount of a load value within the bucket when the work implement has the current attitude, based on the correction data;
obtaining a corrected load value by correcting the load value within the bucket when the work implement has the current attitude using the correction amount; and
correcting a current load value within the bucket based the obtained corrected load value.

2. The work machine according to claim 1, wherein the controller is configured to generate the correction data through computation, when a load value of the bucket in an unloaded state changes.

3. The work machine according to claim 1, wherein, in addition to correction based on the correction data, the controller is configured to correct the load value within the bucket, based on relational data indicative of a magnitude of an error of the load value in the bucket with respect to the load value in the bucket.

4. A system comprising a work machine including:
a work implement having a boom, an arm attached to a leading end of the boom, and a bucket attached to a leading end of the arm; and
a controller:
obtaining a load value within the bucket based on at least one signal of at least one sensor connected to the work implement;
obtaining a load value within the bucket based on the at least one signal of the at least one sensor connected to the work implement when the work implement has a basic attitude, as a reference value, and a load value within the bucket based on the at least one signal of the at least one sensor connected to the work implement when the work implement has an attitude different from the basic attitude, as a comparison value;
generating correction data according to an attitude of the work implement beforehand, based on the reference value and the comparison value;
sensing, via the at least one signal of the at least one sensor connected to the work implement, a current attitude of the work implement;
calculating a correction amount of a load value within the bucket when the work implement has the current attitude, based on the correction data;
obtaining a corrected load value by correcting the load value within the bucket when the work implement has the current attitude using the correction amount; and
correcting a current load value within the bucket based the obtained corrected load value.

5. A method for controlling a work machine including a work implement having a boom, an arm attached to a leading end of the boom, and a bucket attached to a leading end of the arm, the method comprising:
obtaining a load value within the bucket based on at least one signal of the at least one sensor connected to the work implement when the work implement has a basic attitude, as a reference value, and a load value within the bucket based on the at least one signal of the at least one sensor connected to the work implement when the work implement has an attitude different from the basic attitude, as a comparison value;

generating correction data according to an attitude of the work implement, based on the reference value and the comparison value;

sensing, via the at least one signal of the at least one sensor connected to the work implement, a current attitude of the work implement;

calculating a correction amount of a load value within the bucket when the work implement has the current attitude, based on the correction data;

obtaining a corrected load value by correcting the load value within the bucket when the work implement has the current attitude using the correction amount; and correcting a current load value within the bucket based the obtained corrected load value.

* * * * *